Figure 1:
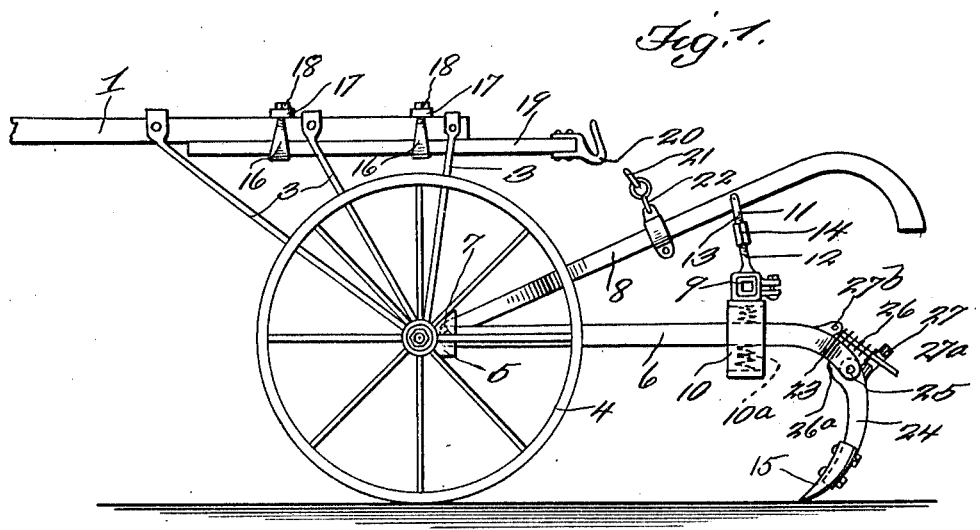

C. G. BRADFORD.
RAKE.
APPLICATION FILED JUNE 18, 1913.

1,088,767.

Patented Mar. 3, 1914.

2 SHEETS—SHEET 1.

Witnesses
Mark DeGrauge,

Inventor
C. G. Bradford,
By D. Swift & Co.
His Attorneys

C. G. BRADFORD.
RAKE.
APPLICATION FILED JUNE 18, 1913.
1,088,767.
Patented Mar. 3, 1914.
2 SHEETS—SHEET 2.
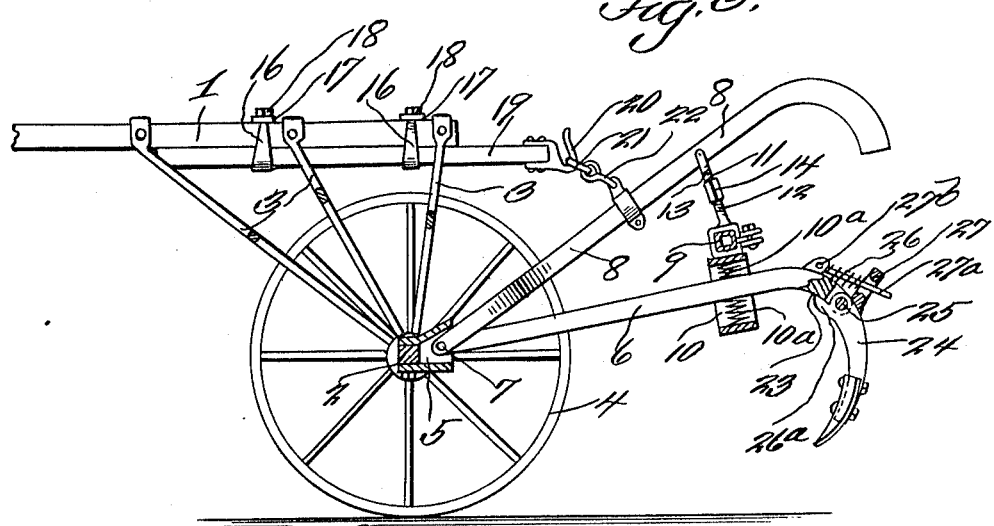
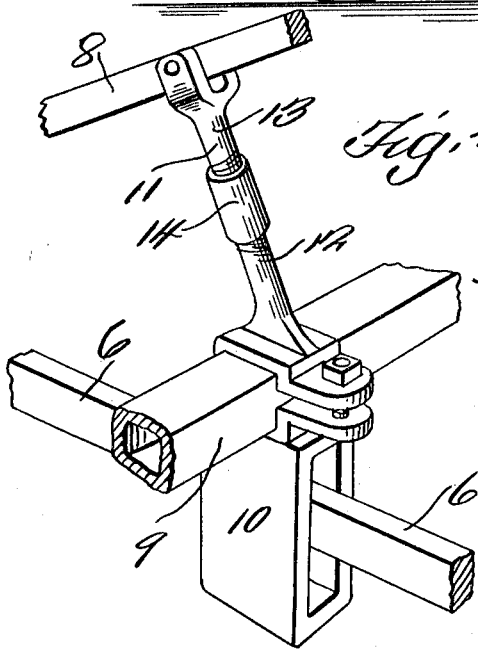
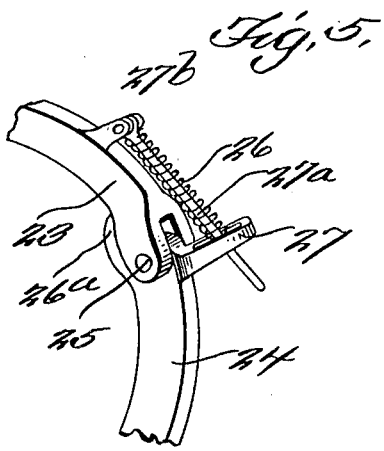
Witnesses
Mark DeGrange
Francis G. Boswell
Inventor
C. G. Bradford,
By D. Swift & Co.,
his Attorneys

UNITED STATES PATENT OFFICE.

CASPER G. BRADFORD, OF JOPLIN, MISSOURI.

RAKE.

1,088,767.

Specification of Letters Patent.

Patented Mar. 3, 1914.

Application filed June 18, 1913. Serial No. 744,404.

*To all whom it may concern:*

Be it known that I, CASPER G. BRADFORD, a citizen of the United States, residing at Joplin, in the county of Jasper and State of Missouri, have invented a new and useful Rake; and I do hereby declare the following to be a full, clear, and exact description of the invention, such as will enable others skilled in the art to which it appertains to make and use the same.

This invention relates to the art of farming implements, and particularly to a new and useful machine for raking stones, stalks, brush, trash and the like. This particular form of machine may be used as a harrow.

One of the features of the invention is the provision of an adjustable member carried by the tongue of the machine, for supporting the series of plow beams, so as to relieve the weight upon the horse's neck.

Another feature of the invention is the provision of a series of plows, each of which is independently and individually movable vertically, and provided with a rearwardly yieldable plow beam section provided with a plow point or blade. Each of the plow beam sections yields individually and independently, so as to pass over an obstruction in its path.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

Figure 2:
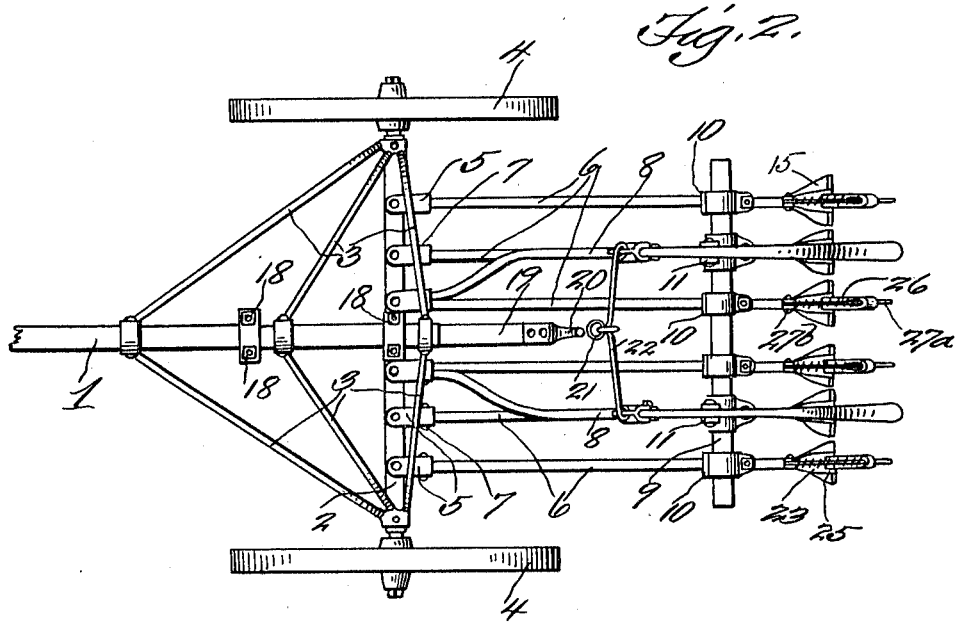

In the drawings:—Figure 1 is a view in side elevation of the improved rake machine constructed in accordance with the invention. Fig. 2 is a plan view of the improved rake machine. Fig. 3 is a sectional view showing the plow beams in a raised position. Fig. 4 is an enlarged detail view, showing how the plow beams are connected to a transverse supporting bar, which in turn is connected to the handles of the machine. Fig. 5 is an enlarged detail view showing the yieldable foot of one of the plow beams.

Referring more particularly to the drawings, 1 designates a tongue, while 2 denotes an axle, which is braced relatively to the tongue by the rods or bars 3. The usual supporting wheels 4 are mounted upon the axle 2. Arranged on the axle 2, equal distances apart is a plurality of boxes or bearing members 5, in each one of which a plow beam 6 is pivoted at 7. Also pivoted at 7 in two of the central boxes or bearings are two handle members 8. Extending transversely of the plow beam adjacent their rear portions immediately above said beams is a tubular rod 9, which is provided with a series of downwardly extending loop members 10, in each one of which a plow beam 6 is arranged, so that each plow beam may rise and lower independently and individually.

Connecting between the tubular rod and the two handles 8 are braces 11. Each brace comprises two sections 12 and 13, connected by a turn buckle sleeve 14, by which the handles may be adjusted relative to the tubular rod 9. By adjusting the handles farther from the tubular rod, the plow blades 15 may be held nearer the ground, that is, when the series of plow beams is held in a supported position. Clamped to the under face of the tongue 1 adjustably, by means of the U-shaped straps 16 and plates 17, there being nuts 18 upon the ends of said straps, is a bar or beam 19. As stated, this beam 19 is adjustable in parallel relation and in alinement with the tongue 1, and is provided with an upwardly extending hook 20, which is designed to be engaged by the loop 21 of a cross bar 22 of the handles, for supporting the same, thereby relieving the weight upon the horses' necks.

Each plow beam is provided with a rearwardly and downwardly curved portion 23, to which a foot member 24 is pivoted at 25, there being a shoulder 26ª preventing the foot member from swinging forwardly too far, there being a spring 26 and a device 27 to hold the foot member against the shoulder 26ª. This spring 26 and device 27 permit the foot to yield rearwardly, in order to allow the plow plate to pass over an obstruction or the like.

From the foregoing it will be observed that there has been devised a simple and efficient rake machine, for raking stones, gravel, brush, weeds, trash, stalks and the like in piles, to be removed subsequently, as well as a machine that may be used as a harrow, and one which has been found desirable and practical.

The invention having been set forth, what is claimed as new and useful is:—

1. In a rake machine, an axle having supporting wheels, a tongue having braces connecting it to said axle, a series of box bearings on the axle, plow beams pivoted in said box bearings, a transverse tubular rod having a plurality of downwardly extending loops in which said plow beams are arranged, handles pivoted in two of said box bearings and having connections with said transverse tubular member, each of the plow beams having an individually and independently yieldable foot provided with a plow plate.

2. In a rake machine, an axle having supporting wheels, a tongue having braces connecting it to said axle, a series of box bearings on the axle, plow beams pivoted in said box bearings, a transverse tubular rod having a plurality of downwardly extending loops in which said plow beams are arranged, handles pivoted in two of said box bearings and having adjustable connections with said transverse tubular member, each of the plow beams having an individually and independently yieldable foot provided with a plow plate.

3. In a rake machine, an axle having supporting wheels, a tongue having braces connecting it to said axle, a series of box bearings on the axle, plow beams pivoted in said box bearings, a transverse tubular rod having a plurality of downwardly extending loops in which said plow beams are arranged, handles pivoted in two of said box bearings and having adjustable connections with said transverse tubular member, each of the plow beams having an individually and independently yieldable foot provided with a plow plate, a beam adjustable parallel to and longitudinally of said tongue, means for holding the beam in adjusted positions, and connections between said beam and the handle, for supporting the plow beams.

In testimony whereof I have signed my name to this specification in the presence of two subscribing witnesses.

CASPER G. BRADFORD.

Witnesses:
JOHN E. CORNELL,
E. E. CORNELL.

---

Copies of this patent may be obtained for five cents each, by addressing the "Commissioner of Patents, Washington, D. C."